(12) United States Patent
Chang et al.

(10) Patent No.: US 8,034,892 B2
(45) Date of Patent: Oct. 11, 2011

(54) BIOCIDAL POLYMER AND PROCESS FOR PREPARING THE SAME

(75) Inventors: Ken-Yuan Chang, Taoyuan Hsien (TW); Cheng-Tar Wu, Taoyuan Hsien (TW); Fa-Chen Chi, Taoyuan Hsien (TW); Kuo-Cheng Lu, Taoyuan Hsien (TW); Lin-Chien Yu, Taoyuan Hsien (TW)

(73) Assignee: Far Eastern New Century Corporation, Taipei (TW)

( * ) Notice: Subject to any disclaimer, the term of this patent is extended or adjusted under 35 U.S.C. 154(b) by 11 days.

(21) Appl. No.: 12/484,793

(22) Filed: Jun. 15, 2009

(65) Prior Publication Data

US 2009/0318659 A1    Dec. 24, 2009

(30) Foreign Application Priority Data

Jun. 18, 2008    (TW) ................................ 97122650 A (51) Int. Cl.
*C08G 63/00*    (2006.01)
*C08G 63/02*    (2006.01)

(52) U.S. Cl. ...................... 528/271; 264/176.1; 264/219; 424/78.6; 428/411.1; 428/412; 528/176; 528/272

(58) Field of Classification Search ............... 264/176.1, 264/219; 424/78.6; 428/411.1, 412; 528/176, 528/271, 272
See application file for complete search history.

(56) References Cited

U.S. PATENT DOCUMENTS
5,490,983 A    2/1996   Worley et al.

OTHER PUBLICATIONS

Koutinas, A. A. et al., "N-Chlorination of Nylon Fabric and Polyurea-6," Journal of Polymer science: Polymer Chemistry Edition, vol. 21, pp. 335-340, (1983).
Sun, Y. et al., "Novel Refreshable N-Halamine Polymeric Biocides: N-Chlorination of Aromatic Polyamides,"Ind. Eng. Chem. Res., vol. 43, pp. 5015-5020, (2004).
Akdag, A. et al., "Why Does Kevlar Decompose, While Nomex Does Not, When Treated with Aqueous Chlorine Solutions?", J. Phys. Chem. B, vol. 111, pp. 5581-5586, (2007).

*Primary Examiner* — Terressa Boykin
(74) *Attorney, Agent, or Firm* — Finnegan, Henderson, Farabow, Garrett & Dunner, L.L.P.

(57) ABSTRACT

A biocidal polymer including at least one repeating unit of formula (A):

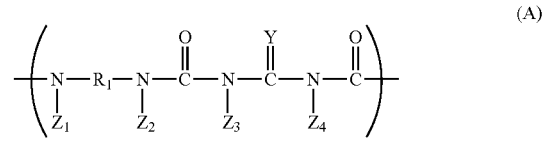

wherein:
R$_1$ in each occurrence independently represents a divalent aromatic group containing 6 to 30 carbon atoms, a C$_2$-C$_{16}$ alkylene group or an alkylene biscyclohexyl;
Y in each occurrence independently represents an oxygen atom or a sulfur atom; and
Z$_1$, Z$_2$, Z$_3$ and Z$_4$ in each occurrence independently represent a hydrogen atom or a halogen atom;
wherein at least one of Z$_1$, Z$_2$, Z$_3$ and Z$_4$ in the at least one repeating unit of formula (A) is a halogen atom.

30 Claims, 1 Drawing Sheet

FIG. 1

BIOCIDAL POLYMER AND PROCESS FOR PREPARING THE SAME

CROSS-REFERENCE TO RELATED APPLICATION

This application claims priority of Taiwanese application no. 097122650, filed on Jun. 18, 2008.

BACKGROUND OF THE INVENTION

1. Field of the Invention

This invention relates to a biocidal polymer, in particular a biocidal polymer the backbone chain of which is constituted of at least one repeating unit having one or more biocidal functionalities, in particular N-halamine groups, and the preparation process and applications thereof.

2. Description of the Related Art

There have been researchers investigating the preparation of high molecular weight N-halamine polymers. For example, in *Journal of Polymer Science: Polymer Chemistry Edition*, Vol. 21, pp. 335-340 (1983), A. A. Koutinas and P. G. Demertzis reported the preparation of N-halamine polymers by chlorinating commercial polymers that carry N—H bonds, such as polyamide and polyurea, in which an organic or inorganic hypochlorite was used as a chlorinating agent. It is noted that if a higher degree of chlorination is intended for a polyamide polymer (i.e., more hydrogen atoms at the N—H bonds of the polyamide polymer are to be substituted by a chlorine atom), a more expensive organic reagent, e.g., tert-butyl hypochlorite (t-BuOCl), should be used and a longer reaction is required.

Thereafter, some investigators developed biocidal polymers the backbone chains of which are grafted with cyclic N-halamine units. However, recent researches reveal that while cyclic N-halamine derivatives exhibit excellent biocidal effects and are more stable than free halogen, ozone, and chlorine dioxide, they require more time to exhibit the biocidal effects thereof and have a molecular weight not greater than 200. Therefore, safety concerns may arise when these cyclic N-halamine derivatives are put into practical use.

In addition, referring to Yuyu Sun and Gang Sun (2004), *Ind. Eng. Chem. Res.*, 43:5015-5020, it is noted that whether or not the N—H bonds of a polymer carrying amide bonds can be chlorinated to a N—Cl bond depends on the existence of α-hydrogen next to the amide bond. Referring to Scheme 1, which shows the mechanism of a chlorination reaction where Ar represents an aromatic group and Me represents a methyl group, if there is no α-hydrogen next to the amide bond, formation of the N—Cl bond is possible.

Scheme 1*

*: Scheme 1 was excerpted from Yuyu Sun and Gang Sun (2004), supra.

Referring to Scheme 2, if there is α-hydrogen next to the amide bond, it is presumed that the α-hydrogen next to the amide bond will be shifted to the nitrogen atom of the amide bond due to 1,4-hydrogen shift, so that the nitrogen atom cannot be bonded with a chlorine atom to form a N—Cl bond, Scheme 2

In order to understand the biocidal mechanism of compounds carrying amide bonds, in the above-described 2004 article, Yuyu Sun and Gang Sun further performed chlorination to commercial polyamides that carried no α-hydrogen, such as the Kevlar polyamide having repeating units represented by the following formula (p1) and the Nomex polyamide having repeating units represented by the following formula (p2).

(p1)

(p2)

Their experimental results reveal that the Nomex polyamide can be continuously chlorinated, whereas the Kevlar polyamide cannot be chlorinated and the chlorination treatment will lead to decomposition thereof. With respect to the observed phenomena, Yuyu Sun et al. proposed that the Kevlar polyamide contains weak para-amide bonds linked to the benzene rings, which makes it easier for the Kevlar polyamide to be hydrolyzed during chlorination.

To explain the decomposition of the Kevlar polyamide caused by chlorination, in *J. Phys. Chem. B*, 111:5581-5586 (2007), S. D. Worley et al., belonging to the same research team of Gang Sun, proposed a reaction mechanism as shown in Scheme 3, which reveals that the chlorinated Kevlar polyamide with contact of water loses one of the chlorine atoms to form a negative charge which, when delocalized, leads to dissociation of the other chlorine to yield a quinone-type structure.

Scheme 3*

*: Scheme 3 was excerpted from S. D. Worley et al. (2007), supra.

In contrast, when the chlorinated Nomex polyamide is dechlorinated, it is presumed that a stable resonance structure as shown in Scheme 4 will be formed.

Scheme 4

In view of the foregoing, it was concluded that two prerequisites may be required for the manufacture of a N-halamine polyamide that exhibits biocidal effects: (1) there is no shiftable α-hydrogen next to the amide bond; and (2) a stable structure will be formed after dechlorination.

Therefore, the research team of S. D. Worley and Gang Sun endeavored to develop cyclic N-halamine polymers that met the above two prerequisites. In fact, in the recent three decades, the research team of S. D. Worley and Gang Sun developed a variety of cyclic N-halamine polymers, including: polymers having side chains grafted with an oxazolidinone of the following formula (p3), polymers having side chains grafted with an imidazolidinone of the following formula (p4), polymers having side chains grafted with a hydantoin of the following formula (p5), etc.,

(wherein $Ra_1$-$Ra_{10}$ independently represent a $C_1$-$C_4$ alkyl group).

These polymers were subjected to a halogenation treatment so that the hydrogen atom of the N—H bond was substituted by a chlorine atom, thereby rendering the chlorinated polymer to become biocidal. For example, U.S. Pat. No. 5,490,983 discloses 9 cyclic N-halamine biocidal polymers. However, during the preparation of these polymers, the cyclic compounds as described above must be subjected to a preliminary treatment for conversion to a reactive functional group that may be grafted onto the side chain of a selected host polymer. Hence, the preparation processes of these polymers have the disadvantages of complexity in manufacture and limited types of host polymers.

Therefore, there is still a need to develop a new biocidal polymer that exhibits excellent biocidal effects and is easy to fabricate.

SUMMARY OF THE INVENTION

Therefore, according to a first aspect, this invention provides a biocidal polymer comprising at least one repeating unit of formula (A):

wherein:
$R_1$ in each occurrence independently represents a divalent aromatic group containing 6 to 30 carbon atoms, a $C_2$-$C_{16}$ alkylene group or an alkylene biscyclohexyl;
Y in each occurrence independently represents an oxygen atom or a sulfur atom; and
$Z_1$, $Z_2$, $Z_3$ and $Z_4$ in each occurrence independently represent a hydrogen atom or a halogen atom;
wherein at least one of $Z_1$, $Z_2$, $Z_3$ and $Z_4$ in the at least one repeating unit of formula (A) is a halogen atom.

In a second aspect, this invention provides a process for preparing a biocidal polymer as described above, comprising subjecting a precursor polymer to a halogenation treatment, the precursor polymer comprising at least one repeating unit of formula (A'):

wherein Y and $R_1$ are the same as those for formula (A) described above;
such that the hydrogen atom in at least one N—H bond of the at least one repeating unit of formula (A') is replaced by a halogen atom.

BRIEF DESCRIPTION OF THE DRAWING

The above and other objects, features and advantages of this invention will become apparent with reference to the following detailed description and the preferred embodiments taken in conjunction with the accompanying drawing, in which.

DETAILED DESCRIPTION OF THE INVENTION

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless otherwise defined, all technical and scientific terms used herein have the meaning commonly understood by a person skilled in the art to which this invention belongs. One skilled in the art will recognize many methods and materials similar or equivalent to those described herein, which could be used in the practice of this invention. Indeed, this invention is in no way limited to the methods and materials described.

In view of the complicated manufacturing procedures for prior known cyclic N-halamine polymers, as well as the structural defects of some prior known chlorinated polyamide/polyurea polymers, the applicants endeavored to develop a novel biocidal polymer which could be easily produced through a simple manufacturing procedure and which could still maintain a stable resonance structure after dechlorination. Specifically, the applicants aimed at the synthesis of a biocidal polymer the backbone chain of which was constituted of at least one repeating unit having one or more biocidal functionalities, in particular the N-halamine groups.

Accordingly, this invention provides a biocidal polymer comprising at least one repeating unit of formula (A):

(A)

wherein:
- $R_1$ in each occurrence independently represents a divalent aromatic group containing 6 to 30 carbon atoms, a $C_2$-$C_{16}$ alkylene group or an alkylene biscyclohexyl;
- Y in each occurrence independently represents an oxygen atom or a sulfur atom; and
- $Z_1$, $Z_2$, $Z_3$ and $Z_4$ in each occurrence independently represent a hydrogen atom or a halogen atom;
- wherein at least one of $Z_1$, $Z_2$, $Z_3$ and $Z_4$ in the at least one repeating unit of formula (A) is a halogen atom.

In a preferred embodiment of this invention, at least one of $Z_3$ and $Z_4$ in the at least one repeating unit of formula (A) is a halogen atom. In a more preferred embodiment of this invention, both $Z_3$ and $Z_4$ in the at least one repeating unit of formula (A) are a halogen atom.

According to this invention, the halogen atom is selected from the group consisting of chlorine, bromine, and a combination thereof. In a preferred embodiment of this invention, the halogen atom is chlorine.

In a preferred embodiment of this invention, in the at least one repeating unit of formula (A) of the biocidal polymer according to this invention, Y in each occurrence represents an oxygen atom.

According to this invention, the biocidal polymer may further comprise at least one repeating unit of formula (B):

(B)

wherein:
- $R_1$ in each occurrence is the same as that for formula (A) described above;
- $R_2$ in each occurrence independently is a group represented by a formula selected from:

(i)

wherein:
- $R_3$ is an ethylene group, and $n_1$ is an integer ranging from 1 to 227;
- or $R_3$ is a propylene group, and $n_1$ is an integer ranging from 1 to 172;
- or $R_3$ is a tetramethylene group, and $n_1$ is an integer ranging from 1 to 138;

(ii)

wherein:
- $R_4$ is a $C_2$-$C_{16}$ alkylene group;

(iii)
$$—\overset{H}{\underset{|}{N}}—R_5—\overset{H}{\underset{|}{N}}—,$$

wherein:
- $R_5$ represents a $C_2$-$C_{16}$ alkylene group, a divalent aromatic group containing 6 to 30 carbon atoms, an alkylene biscyclohexyl group, (iv)

wherein:
- $R_6$, $R_7$ and $R_8$ independently represent a $C_2$-$C_{16}$ alkylene group, and $n_2$ is an integer ranging from 1 to 46; and (v)

wherein:
- $R_9$ and $R_{11}$ independently represent a $C_2$-$C_{16}$ alkylene group,
- $R_{10}$ represents a $C_2$-$C_{16}$ alkylene group or —$R_{12}$—O—$R_{13}$—,
- $R_{12}$ and $R_{13}$ independently represent a $C_2$-$C_4$ alkylene group, and
- $n_3$ and $n_4$ independently are an integer ranging from 1 to 86; and
- $Z_5$ and $Z_6$ in each occurrence independently represent a hydrogen atom or a halogen atom.

In a preferred embodiment of this invention, in the at least one repeating unit of formula (A) and the at least one repeat- ing unit of formula (B) of the biocidal polymer, $R_1$ in each occurrence independently represents a divalent aromatic group containing 6 to 13 carbon atoms, a $C_2$-$C_{12}$ alkylene group, or a 4,4'-methylene biscyclohexyl group

In a more preferred embodiment of this invention, in the at least one repeating unit of formula (A) and the at least one repeating unit of formula (B) of the biocidal polymer, $R_1$ in each occurrence independently represents a $C_2$-$C_8$ alkylene group, a phenylene group, a naphthylene group, a 3-methyl-m-phenylene group a 2-methyl-p-phenylene group or a 4,4'-methylene bisphenyl group or a 4,4'-methylene biscyclohexyl group.

In a preferred embodiment of this invention, in the at least one repeating unit of formula (B) of the biocidal polymer, $R_2$ is a group represented by the formula in which $R_3$ is an ethylene group and $n_1$ is an integer ranging from 1 to 91. More preferably, $n_1$ is an integer ranging from 1 to 45.

In another preferred embodiment of this invention, in the at least one repeating unit of formula (B) of the biocidal polymer, $R_2$ in each occurrence independently is a group represented by the formula in which $R_3$ is a propylene group and $n_1$ is an integer ranging from 1 to 70. More preferably, $n_1$ is an integer ranging from 1 to 34.

In a further preferred embodiment of this invention, in the at least one repeating unit of formula (B) of the biocidal polymer, $R_2$ in each occurrence independently is a group represented by the formula in which $R_3$ is a tetramethylene group and $n_1$ is an integer ranging from 1 to 56. More preferably, $n_1$ is an integer ranging from 1 to 28.

In another preferred embodiment of this invention, in the at least one repeating unit of formula (B) of the biocidal polymer, $R_2$ in each occurrence independently is a group represented by the formula —O—$R_4$—O—, in which $R_4$ is a tetramethylene group.

In another further preferred embodiment of this invention, in the at least one repeating unit of formula (B) of the biocidal polymer, $R_2$ in each occurrence independently is a group represented by the formula in which $R_5$ is a divalent aromatic group containing 6 to 13 carbon atoms, a $C_2$-$C_{12}$ alkylene group, a 4,4'-methylene biscyclohexyl group,

More preferably, $R_5$ is a $C_2$-$C_8$ alkylene group, a phenylene group, a naphthylene group, a 4,4'-methylene bisphenyl group, a 4,4'-methylene biscyclohexyl group, a 3-methyl-m-phenylene group, a 2-methyl-p-phenylene group,

Most preferably, $R_5$ is a $C_2$-$C_6$ alkylene group or a phenylene group.

In a further preferred embodiment of this invention, in the at least one repeating unit of formula (B) of the biocidal polymer, $R_2$ in each occurrence independently is a group represented by the formula in which $R_6$, $R_7$ and $R_8$ independently represent a $C_2$-$C_{12}$ alkylene group. Preferably, $n_2$ is an integer ranging from 1 to 18. More preferably, $n_2$ is an integer ranging from 1 to 9.

In a further preferred embodiment of this invention, in the at least one repeating unit of formula (B) of the biocidal polymer, $R_2$ in each occurrence independently is a group represented by the formula wherein: $R_9$ and $R_{11}$ independently represent a $C_2$-$C_{12}$ alkylene group; and $R_{10}$ is a $C_2$-$C_{12}$ alkylene group or —$R_{12}$—O—$R_{13}$—, where $R_{12}$ and $R_{13}$ independently represent a $C_2$-$C_4$ alkylene group. Preferably, $n_3$ and $n_4$ independently are an integer ranging from 1 to 34. More preferably, $n_3$ and $n_4$ independently are an integer ranging from 1 to 17.

In a preferred embodiment of this invention, in the at least one repeating unit of formula (A) and the at least one repeating unit of formula (B) of the biocidal polymer, $R_1$ in each occurrence independently represents a $C_2$-$C_6$ alkylene group or 4,4'-methylene bisphenyl; Y in each occurrence represents an oxygen atom; and $R_2$ in each occurrence independently is a group represented by a formula selected from and —O—$R_4$—O—, wherein $R_3$ is an ethylene group and $n_1$ is an integer ranging from 30 to 50, or $R_3$ is a tetramethylene group and $n_1$ is an integer ranging from 24 to 32; and $R_4$ is a tetramethylene group.

Preferably, in the biocidal polymer according to this invention, the molar ratio of the at least one repeating unit of formula (A) to the at least one repeating unit of formula (B) is in a range of 0.003:0.997 to 0.999:0.001.

According to this invention, the biocidal polymer comprising the at least one repeating unit of formula (A) may be prepared by subjecting a precursor polymer to a halogenation treatment, the precursor polymer comprising at least one repeating unit of formula (A'):

wherein Y and $R_1$ are the same as those for formula (A) described above;

such that the hydrogen atom in at least one N—H bond of the at least one repeating unit of formula (A') is replaced by a halogen atom.

According to this invention, the halogenation treatment may be implemented using a halogenating reagent containing chlorine, bromine or a combination thereof.

The halogenating reagents suitable for use in this invention include, but are not limited to: perhalic acid or perhalates, halic acid or halates, halous acid or halites, hypohalous acid or hypohalites, halogen gases, trichloroisocyanuric acid (TCCA), or combinations thereof.

In a preferred embodiment of this invention, the halogenating reagent is sodium hypochlorite.

According to this invention, the degree of halogenation may be adjusted by controlling the chemical stoichiometry of the used precursor and halogenating reagent.

According to this invention, the precursor polymer may be prepared by subjecting a mixture of at least one diamine and at least one diisocyanate to a polymerization reaction, wherein the at least one diamine is selected from urea, thiourea and a combination thereof, and wherein the at least one diisocyanate has a chemical structure of formula (I):

OCN—$R_1$—NCO  (I)

wherein $R_1$ is the same as that for formula (A) described above.

In a preferred embodiment of this invention, the at least one diamine used in the process of this invention is urea.

In a preferred embodiment of this invention, in the at least one diisocyanate used in the process of this invention, $R_1$ is a divalent aromatic group containing 6 to 13 carbon atoms, a $C_2$-$C_{16}$ alkylene group, or a 4,4'-methylene biscyclohexyl group.

In a more preferred embodiment of this invention, in the at least one diisocyanate used in the process of this invention, $R_1$ is a $C_2$-$C_{16}$ alkylene group, a phenylene group, a naphthylene group, a 3-methyl-m-phenylene group, a 2-methyl-p-phenylene group, a 4,4'-methylene bisphenyl group, or a 4,4'-methylene biscyclohexyl group.

According to this invention, the mixture to be subjected to the polymerization reaction may further comprise at least one active hydrogen-containing compound. When the at least one active hydrogen-containing compound has a chemical structure of formula (II):

H—$R_2$—H  (II)

wherein $R_2$ is the same as that for formula (B) described above; the precursor polymer thus formed would further comprise at least one repeating unit of formula (B'):

(B')

wherein:

$R_1$ is the same as that for formula (A) described above; and $R_2$ is the same as that for formula (B) described above.

As such, halogenation of said precursor polymer thus formed gives rise to the formation of the biocidal polymer of this invention that further comprises the at least one repeating unit of formula (B).

In a preferred embodiment of this invention, the at least one active hydrogen-containing compound is one where $R_2$ is a group represented by the formula in which $R_3$ is an ethylene group and $n_1$ is an integer ranging from 1 to 91. More preferably, no is an integer ranging from 1 to 45.

In another preferred embodiment of this invention, the at least one active hydrogen-containing compound is one where $R_2$ is a group represented by the formula in which $R_3$ is a propylene group and $n_1$ is an integer ranging from 1 to 70. More preferably, $n_1$ is an integer ranging from 1 to 34.

In a further preferred embodiment of this invention, the at least one active hydrogen-containing compound is one where $R_2$ is a group represented by the formula in which $R_3$ is a tetramethylene group and $n_1$ is an integer ranging from 1 to 56. More preferably, $n_1$ is an integer ranging from 1 to 28.

In another preferred embodiment of this invention, the at least one active hydrogen-containing compound is one where $R_2$ is a group represented by the formula —O—$R_4$—O—, in which $R_4$ is a tetramethylene group.

In a further preferred embodiment of this invention, the at least one active hydrogen-containing compound is one where $R_2$ is a group represented by the formula in which $R_5$ is a divalent aromatic group containing 6 to 13 carbon atoms, a $C_2$-$C_{12}$ alkylene group, a 4,4'-methylene biscyclohexyl group, More preferably, $R_5$ is a $C_2$-$C_8$ alkylene group, a phenylene group, a naphthylene group, a 4,4'-methylene bisphenyl group, a 4,4'-methylene biscyclohexyl group, a 3-methyl-m-phenylene group, a 2-methyl-p-phenylene group,

Most preferably, $R_5$ is a $C_2$-$C_6$ alkylene group or a phenylene group.

In one other preferred embodiment of this invention, the at least one active hydrogen-containing compound is one where $R_2$ is a group represented by the formula in which $R_6$, $R_7$ and $R_8$ independently represent a $C_2$-$C_{12}$ alkylene group. Preferably, $n_2$ is an integer ranging from 1 to 18. More preferably, $n_2$ is an integer ranging from 1 to 9.

In one other preferred embodiment of this invention, the at least one active hydrogen-containing compound is one where $R_2$ is a group represented by the formula wherein: $R_9$ and $R_{11}$ independently represent a $C_2$-$C_{12}$ alkylene group; and $R_{10}$ is a $C_2$-$C_{12}$ alkylene group or —$R_{12}$—O—$R_{13}$—, where $R_{12}$ and $R_{13}$ independently represent a $C_2$-$C_4$ alkylene group. Preferably, $n_3$ and $n_4$ independently are an integer ranging from 1 to 34. More preferably, $n_3$ and $n_4$ independently are an integer ranging from 1 to 17.

In a preferred embodiment of this invention, the used diamine is urea; the used diisocyanate is one where $R_1$ represents a $C_2$-$C_6$ alkylene group or 4,4'-methylene bisphenyl; and the used active hydrogen-containing compound is one where $R_2$ is a group represented by a formula selected from wherein $R_3$ is an ethylene group and $n_1$ is an integer ranging from 30 to 50, or $R_3$ is a tetramethylene group and $n_1$ is an integer ranging from 24 to 32; and $R_4$ is a tetramethylene group.

Based on the total moles of the at least one diamine and the at least one diisocyanate used in the process according to this invention, the at least active hydrogen-containing compound is used in an amount ranging from 0.3 mol % to 99.7 mol %.

The precursor polymer used in this invention may be prepared by conventional processes known in the art for the polymerization of a mixture containing a diamine, a diisocyanate and, optionally, an active hydrogen-containing compound. It is appreciable that the types and amounts of these two or three components can be varied and adjusted so as to obtain a precursor polymer having the desired average weight molecular weight.

According to this invention, the average weight molecular weight of the biocidal polymer according to this invention may vary depending on the specific precursor polymer that was used. The precursor polymer preferably has an average weight molecular weight ranging from 500 to 2,000,000, and more preferably, from 500 to 1,000,000. Therefore, in light of the ultimate usage thereof, a biocidal polymer having an appropriate average weight molecular weight may be easily produced.

The applicants found that the precursor polymer used in this invention could be easily halogenated to form the biocidal polymer according to this invention, which could remain stable after being dehalogenated. A possible explanation for the observed findings may be that in the backbone chain of the precursor polymer, the at least one repeating unit of formula (A') has at least four N—H bonds capable of being halogenated and there appears to be no shiftable α-hydrogen next to the amide bond in the at least one repeating unit of formula (A'). In addition, dehalogenation of the biocidal polymer of this invention may result in the formation of a stable resonance structure, probably via a reaction mechanism as shown in Scheme 5.

Scheme 5

The biocidal polymer according to this invention can be fabricated into a form selected from fiber, fabric, film, foam, gel and solution by methodologies well known in the art. For example, a precursor polymer as described above may be dissolved in a suitable organic solvent and the resultant mixture is used to prepare a thin film, which is subsequently immersed in an aqueous solution containing chlorine ions to effect chlorination, thereby resulting in a biocidal film according to this invention.

The organic solvent suitable for use in this invention includes, but is not limited to: dimethylacetamide (DMAC), acetone, butanone, ethyl acetate, toluene, n-butyl acetate, N,N-dimethylformamide (DMF), tetrahydrofuran (THF), N-methyl-2-pyrrolidone (NMP), dimethyl sulfoxide (DMSO), or a combination thereof. In a preferred embodiment of this invention, the organic solvent is DMAC.

Alternatively, the biocidal polymer may be fabricated into a surface treating agent. For example, a biocidal polymer according to this invention may be dissolved in an appropriate organic solvent, such as one selected from those listed above. The resultant mixture can then be applied onto a surface in need of disinfection treatment via spraying or painting, etc.

When the biocidal polymer according to this invention is fabricated in a film form, it may be prepared by treating a film made of a corresponding precursor polymer with a halogen-containing solution, e.g., an aqueous sodium hypochlorite solution, the halogen content of which may be adjusted so as to control the degree of halogenation of the resultant biocidal film. According to experimentation, immersing a thin film of a precursor polymer in an aqueous sodium hypochlorite solution at a concentration of 0.6~1.4 wt % for 30 min is sufficient to obtain a biocidal film according to this invention.

It is contemplated that all materials and methodologies described herein may be used for practicing this invention.

This invention will be further described by way of the following examples. One of ordinary skill in the art is familiar with many techniques and teachings allowing the modification of these examples and the examples noted throughout this disclosure that would also employ the basic, novel, or advantageous characteristics of the invention. Thus, the scope of this invention is not limited by the particular examples listed here or elsewhere.

EXAMPLES

Reagents:

Polytetramethylene ether glycol (PTMEG) having an average number molecular weight ($M_n$) of about 2000 was purchased from Aldrich Chemical Co. (Cat. No. 13440).

Polyethylene glycol A (PEG-A, MW=1900~2200) was purchased from Fluka AG (Cat. No. 81221).

Polyethylene glycol B (PEG-B, MW=1400~1600) was purchased from Merck (Cat. No. 8.07489.10000).

N,N-dimethylacetamide (DMAC) was purchased from Acros Organics (Cat. No. TG-005).

1,4-Butanediol (1,4-BD) was purchased from Sigma-Aldrich, Inc. (Cat. No.493732).

4,4'-Diphenylmethane diisocyanate (4,4'-MDI) was purchased from Aldrich Chemical Co. (Cat. No. 256439).

Urea was purchased from Sigma-Aldrich, Inc. (Cat. No. U5128).

Sodium hypochlorite (NaOCl) was purchased from Riedel-de Haën (Cat. No. 13440).

1,6-hexamethylene diisocyanate (HDI) was purchased from TCI (Cat. No. H0324).

Measurements:

$^1$H-NMR spectra were recorded using a Bruker AVANCE DRX 300 spectrometer.

$^{13}$C-NMR spectra were recorded at 100 MHz using a Bruker AVANCE DRX 400 MHz spectrometer.

FT-IR spectra were recorded on a Perkin-Elmer Spectrum One-FT-IR Spectrophotometer.

X-ray photoelectron spectroscopy (XPS) spectra were recorded using a Thermo Scientific Theta Probe (XPS X-ray source: microfocused electron gun and multi-position aluminum anode, monochromated X-ray Source; electron analyzer: two-dimensional, multi-channel spectroscopic detector and 5-axis sample stage).

Example 1

Preparation of Precursor Polymers

Precursor polymers (PP) 1-7 were prepared using the reagents as 5 shown in Table 1.

TABLE 1

Reagents used in the preparation of precursor polymers (PP) 1-7.

| | Polyol | | | | Diisocyanate | |
|---|---|---|---|---|---|---|
| | Type | Amount (g) | 1,4-BD (g) | Urea (g) | Type | Amount (g) | Dried weight of PP (g) |
| PP1 | PTMEG | 58.8 | 2.3 | 0.5 | MDI | 15.8 | 62.1 |
| PP2 | PTMEG | 58.8 | 1.5 | 1.0 | MDI | 15.8 | 58.7 |
| PP3 | PTMEG | 58.8 | 0.75 | 1.5 | MDI | 15.8 | 56.4 |
| PP4 | PTMEG | 58.8 | 2.3 | 0.5 | HDI | 10.6 | 50.2 |
| PP5 | PEG-A | 58.8 | 2.3 | 0.5 | MDI | 15.8 | 54.0 |
| PP6 | PEG-B | 120 | 17.28 | 2.88 | MDI | 80 | — |
| PP7 | — | 0 | 0 | 10 | MDI | 41.67 | 40.2 |

—: not added or not measured.

A. Preparation of Precursor Polymers:

Precursor polymer 1 (PP1) was prepared as follows: 58.8 g of PTMEG was placed into a 4-necked reaction flask and then dried in a 100° C. vacuum oven with a degree of vacuum of 1 torr for 8 hrs. The dried PTMEG together with 30 mL DMAC was placed into a 60° C. stirred-tank reactor having an overhead stirrer (Tung Kuang Glassware Industrial Co., Ltd., Model A-138-04), followed by drying at a degree of vacuum of 1 torr for 2 hrs. The reactor was added with 2.3 g of 1,4-BD, following by heating to 80° C. After temperature balance was achieved for about 0.5 hr at 80° C., 0.5 g of urea was added into the reactor with even stirring. 15.0 g of MDI (corresponding to 95% of the total equivalent of PTMEG, 1,4-BD and urea) was subsequently added to result in the formation of a polymerization mixture, which was slowly diluted by the addition of DMAC under a stirring rate of 300 rpm until the viscosity thereof reached a stable value.

The applicants found that the further addition of DMAC could improve the dispersion of the resultant polymers and prevent the local formation of polymers of undesirably high molecular weights. In addition, the added amount of DMAC was determined based on the solid content of the polymerization mixture, so that the total weight of PTMEG, 1,4-BD and urea in the polymerization mixture preferably fell within 20~30wt %.

Thereafter, an additional amount of MDI (about 0.8 g, approximately corresponding to 5% of the total equivalent of PTMEG, 1,4-BD and urea) was added into the reactor so that the viscosity of the polymerization mixture was increased to reach a stable value higher than the previous one, followed by stopping heating and an immediate addition of 10 mL methanol so as to stop reaction. The reaction mixture containing the resultant precursor polymer, i.e., PP1, was poured into ice water to result in precipitation of PP1, which was collected and dried in a 90° C. oven for 1 day, giving a dried product of 62.1 g.

Precursor polymers (PP) 2-6 were prepared substantially according to the procedures as described above, except that different types and amounts of reagents were used as shown in Table 1. The dried weights of the precursor polymers (PP) 1-5 thus obtained are also summarized in Table 1.

Precursor polymer 7 (PP7) was prepared as follows: 10 g of urea in 50 mL DMAC was added into a 4-necked reaction reactor with even stirring at 80° C., followed by addition of 41.67 g of MDI to result in the formation of a polymerization mixture, which was slowly diluted by the addition of DMAC under a stirring rate of 300 rpm until the viscosity thereof reached a stable value, followed by stopping heating and an immediate addition of 10 mL methanol so as to stop reaction. The reaction mixture containing the resultant precursor polymer, i.e., PP7, was poured into ice water to result in precipitation of PP7, which was collected and dried in a 90° C. oven for 1 day, giving a dried product of 40.2 g.

B. Structural Characterization of Precursor Polymers:

The obtained precursor polymers (PP) 1-7 were subjected to structural characterization by NMR and FT-IR measurements. The obtained results of PP1, PP2 and PP6 are summarized below:

1. Structural Characterization of PP1:

$^1$H-NMR (d$^7$-DMF, δ, ppm, 300 MHz): 7.49 (d, J=6.3 Hz, 4H, —ArH), 7.15 (d, J=6.3 Hz, 4H, —ArH), 5.32 (t, J=3.3 Hz, 0.3 H, —NH), 4.14-4.09 (m, 3.5 H, —CH$_2$ of urethane), 3.85 (br, 2H, —ArCH$_2$Ar—), 3.47 (br, 52H, —OCH$_2$ of PTMEG), 1.72-1.64 (m, 3.5H, —CH$_2$), 1.56 (br, 52H, —CH$_2$ of PTMEG).

FT-IR (KBr, υ cm$^{-1}$): 3312 (N—H stretching), 2940 (Sp$^3$ C—H stretching), 2852 (SP$^3$ C—H stretching), 2797 (Sp$^3$ C—H stretching), 1728 (C=O stretching), 1671 (C=O stretching), 1594 (C=C stretching), 1478 (C=C stretching), 1221 (C—O stretching).

According to the results of structural characterization, PP1 was determined to have a number of repeating units represented by the following formula (EA) and (EB), respectively:

(EA)

(EB)

wherein in the repeating unit of formula (EB), R$_2$ is selected from in which n$_1$ is estimated to be a number of 27 based on the molecular weight of PTMEG.

2. Structural Characterization of PP2:

$^1$H-NMR (d$^7$-DMF, δ, ppm, 300 MHz): 7.64 (d, J=6.0 Hz, 4H, —ArH), 7.31 (d, J=6.0 Hz, 4H, —ArH), 5.51 (t, J=3.3 Hz, 0.4 H, —NH), 4.30-4.24 (m, 3H, —CH$_2$ of urethane), 4.02 (br, 2H, —ArCH$_2$Ar—), 3.55 (br, 52H, —OCH$_2$ of PTMEG), 1.74 (br, 3H, —CH$_2$), 1.61 (br, 52H, —CH$_2$ of PTMEG).

FT-IR (KBr, υ cm$^{-1}$): 3302 (N—H stretching), 2928 (Sp$^3$ C—H stretching), 2791 (Sp$^3$ C—H stretching), 2846 (SP$^3$ C—H stretching), 1731 (C=O stretching), 1698 (C=O stretching), 1643 (C—N stretching), 1597 (C=C stretching), 1531 (N—H band), 1476 (C=C stretching), 1212 (C—O stretching).

According to the results of structural characterization, PP2 was determined to have a number of repeating units respectively represented by formula (EA) and (EB) as described above for PP1.

3. Structural Characterization of PP6:

$^{13}$C-NMR (d$^7$-DMF, δ, ppm, 100 MHz): 154.3, 154.2, 153.3, 138.5, 137.9, 136.2, 135.7, 118.8 (C); 129.3 (CH); 70.6, 64.3, 40.5 (CH$_2$).

FT-IR (KBr, υ cm$^{-1}$): 3337 (N—H stretching), 2872 (SP$^3$ C—H stretching), 1700 (C=O stretching), 1597 (C=C stretching), 1413 (C=C stretching), 1223 (C—O stretching).

According to the results of structural characterization, PP6 was determined to have a number of repeating units respectively represented by formula (EA) and (EB) as described above for PP1, except that in the repeating unit of formula (EB), R$_2$ is selected from in which n$_1$ is estimated to be a number of about 31~36 based on the molecular weight of PEG-B.

Example 2

Preparation of Biocidal Polymers

Instead of pouring into ice water, a reaction mixture as obtained after addition of methanol in the preparation of a precursor polymer exemplified in Example 1, was cooled to room temperature and then admixed with 17 mmole sodium hypochlorite overnight so as to chlorinate the resultant precursor polymer contained in the reaction mixture. The reaction mixture after chlorination was detected to have a solid content of 20 wt % and a viscosity of about 76,400 cps (23° C.).

The reaction mixture after chlorination may be poured into ice water to precipitate the chlorinated precursor polymer contained therein, resulting in a biocidal polymer according to this invention.

A biocidal polymer BP7 in dried powder form, which was prepared from PP7 according to the aforesaid, was fabricated into a tablet A for use in antibacterial tests, and a comparative tablet B was prepared from the non-chlorinated PP7 for comparison.

As an alternative, the reaction mixture may be directly used as a coating solution for industrial applications.

Example 3

Preparation of Biocidal Films

An appropriate amount of PP1 as obtained in Example 1 described above was dissolved in DMAC under heating at 80° C., so as to form a coating solution containing 20 wt % of PP1. The coating solution was poured onto a release film placed inside a container and evenly spread by a stainless steel rod, so as to form a thin film on the release film. The resultant thin film was heated in a 90° C. oven for about 2 hrs to remove DMAC, giving a dried thin film with a thickness of 200 μm. The dried thin film was subsequently subjected to chlorination by immersing in an aqueous solution containing 1.2~2.8 wt % sodium hypochlorite for 2 days. Thereafter, a biocidal film BF1 containing the chlorinated PP1 was obtained.

It was found from the FT-IR spectrum of the biocidal film BF1 that the intensity of the N—H peak previously existing in the FT-IR spectrum of PP 1 decreased.

Biocidal films BF2-BF6 were prepared substantially according to the procedures described above for the biocidal film BF1, except that PP2-PP6 as obtained in Example 1 were used in place of PP1 and that the immersing time was reduced to 30 min.

It was similarly found from the FT-IR spectra of the biocidal films BF1-BF6 that the intensity of the N—H peaks previously existing in the FT-IR spectra of PP2-PP6 decreased.

Figure 1:
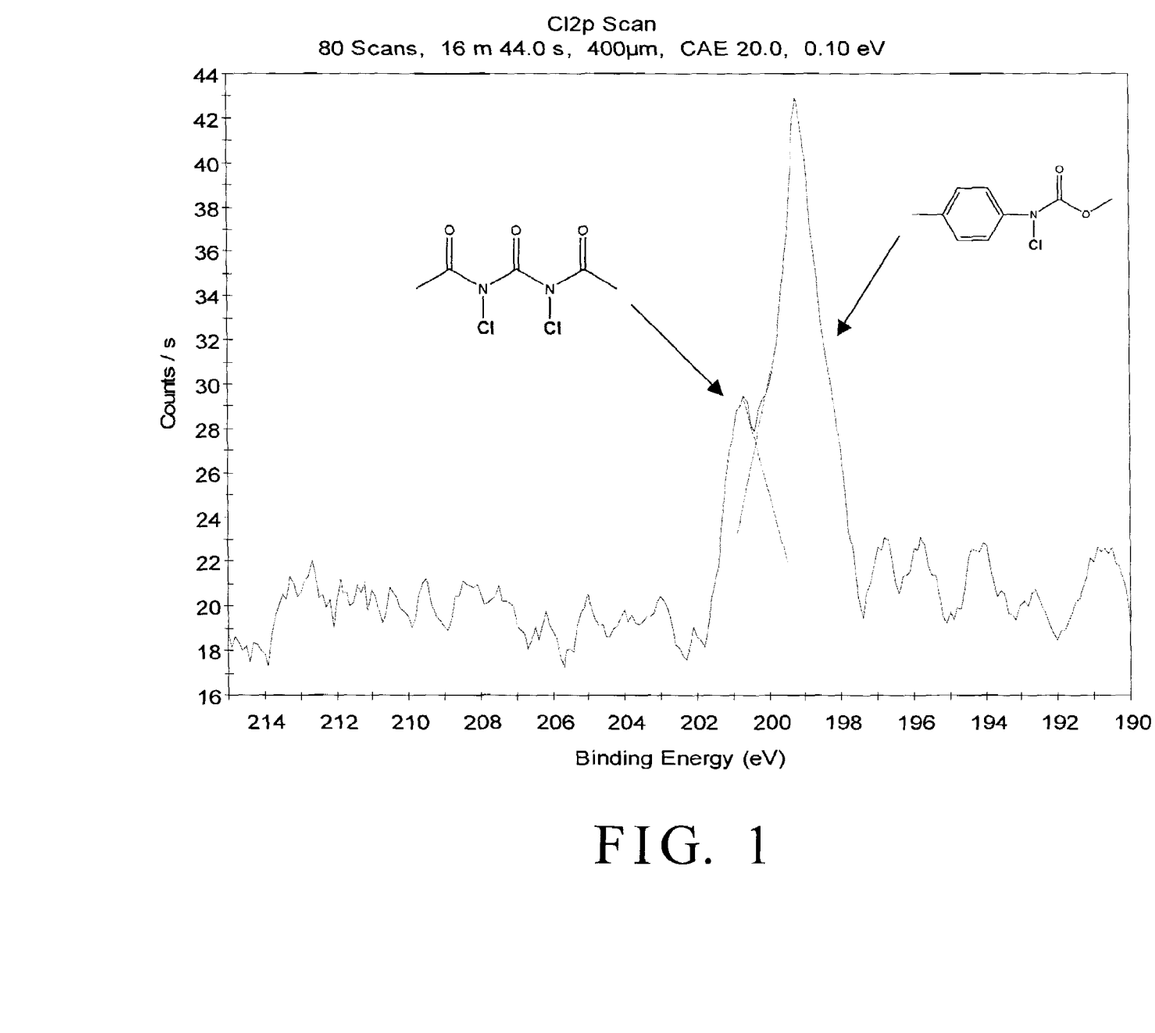
FIG. 1 shows the XPS spectrum of a biocidal film BF6 according to this invention as prepared in Example 3, infra.

Besides, according to the XPS spectrum of the biocidal film BF6 as shown in FIG. 1, it was found that two N-halamine groups were formed at $Z_3$ and $Z_4$ of the formula (A) according to this invention and a N-halamine group was formed at $Z_6$ of the formula (B) according to this invention.

For comparison, the non-chlorinated dried thin films as prepared from PP1-PP6 were used as comparative films CF1-CF6, respectively.

Example 4

Antibacterial Test

A. Culturing of Bacteria:

A single colony of *Staphylococcus aureus* (BCRC Number 15211) was picked up from a preserved agar plate and inoculated into a 15 mL centrifuge tube containing 2000 µL LB broth, followed by vortexing for 10 min to suspend bacterial cells, so as to form a stock bacterial solution, which was subsequently subjected to 10-fold series dilution by using LB broth to afford $10^{-1}$-, $10^{-2}$-, $10^{-3}$-, $10^{-4}$- and $10^{-5}$-fold diluted bacterial solutions. Thereafter, the bacterial solutions of different dilutions, each in an amount of 100 µL, were respectively inoculated onto an agar plate and spread evenly, followed by cultivation in a 37° C. incubator for 14~24 hrs. Based on the calculated colony forming units (CFU) of the cultivated agar plates, a testing solution with a bacterial concentration of $10^6$~$10^7$ CFU/mL was obtained by diluting an appropriate amount of the stock bacterial solution with sterilized water.

B. Qualitative Antibacterial Assay:

100 µLs of the testing solution as prepared above were separately inoculated onto different agar plates and spread evenly. The thin films BF1-BF5 and CF1-CF6 as prepared in Example 3, which were tailored to form a round test film having a diameter of 1.5 cm, respectively, were separately attached onto an agar plate spread with the testing solution. The agar plates were then cultivated in a 37° C. incubator for 14~24 hrs. Thereafter, the peripheries and surfaces of these testing films were observed.

In addition to the aforesaid thin films, the tablets A and B as prepared in Example 2 were tested in a similar manner.

This experiment was run in duplicate. It was found from naked-eye observation that no bacterial colony was grown around the peripheries and on the surfaces of the tested thin films BF1-BF5 and the tablet A, whereas bacterial colonies appeared around the peripheries and on surfaces of the tested thin films CF1-CF6 and the tablet B.

C. Quantitative Antibacterial Assay:

The thin films BF1-BF6, CF1, CF2 and CF6 as prepared in Example 3, were tailored to form a square test film of 2×2 cm², respectively, and then separately attached onto the bottom of a 50 mL serum bottle.

To a first experimental group, 20 µL of the testing solution as prepared above, which had a bacterial concentration of $10^6$~$10^7$ CFU/mL, was applied onto each of the square test films at 37° C. After application of the testing solution, each square test film was immediately washed with 20 mL sterilized water and the washed water was collected to serve as a first bacterial solution sample.

To a second experimental group, 20 µL of the testing solution as prepared above, which had a bacterial concentration of $10^6$~$10^7$ CFU/mL, was applied onto each of the square test films at 37° C. After cultivation for 24 hrs, each square test film was washed with 20 mL sterilized water and the washed water was collected to serve as a second bacterial solution sample.

The first and second bacterial solution samples were then 10-fold series diluted with sterilized water to yield $10^{-1}$, $10^{-2}$, $10^{-3}$, $10^{-4}$ and $10^{-5}$ dilutions. Different dilutions of the first and second bacterial solution samples, each in an amount of 100 µL, were respectively inoculated onto an agar plate and spread evenly. After cultivation in a 37° C. incubator for 14~24 hrs, the numbers of bacterial colonies grown on the cultivated agar plates were calculated so as to determine the CFUs of the first and second bacterial solution samples. The experiment was run in duplicate.

Based on the calculated CFUs of the first and second bacterial solution samples, the antibacterial activities of the thin films BF1-BF6, CF1, CF2 and CF6 could be determined according to the following equation (M):

$$\text{Antibacterial activity} = \frac{A - B}{A} \times 100\% \tag{M}$$

wherein:
- A: the calculated CFU of the first bacterial solution sample (collected after cultivation for 0 hr); and
- B: the calculated CFU of the second bacterial solution sample (collected after cultivation for 24 hrs).

If the value of B is far greater than that of A, it means that the tested thin film does not have antibacterial activity.

The antibacterial activities of the thin films BF1-BF6, CF1, CF2 and CF6 are summarized in Table 2, in which the colony density (CFU/cm²) is expressed by dividing a calculated CFU by the area (2×2 cm²) of a thin film.

TABLE 2

The antibacterial activities of the thin films BF1-BF6, CF1, CF2 and CF6.

| Thin film | Colony density (CFU/cm²) | | Antibacterial activity (%) |
|---|---|---|---|
| | Cultivation for 0 hr | Cultivation for 24 hr | |
| BF1 | 3.7 (±0.3) × 10³ | 0 | >99.9 |
| BF2 | 3.1 (±0.65) × 10³ | 0 | >99.9 |
| BF3 | 1.8 (±0) × 10³ | 0 | >99.9 |
| BF4 | 0.5 (±0.3) × 10³ | 0 | >99.9 |
| BF5 | 4.0 (±0.48) × 10³ | 0 | >99.9 |
| BF6 | 7.9 (±0.87) × 10⁴ | 0 | >99.9 |
| CF1 | 3.7 (±0.88) × 10³ | 3.8 (±0.0) × 10⁵ | 0 |
| CF2 | 3.1 (±0.25) × 10³ | 7.9 (±0.5) × 10⁶ | 0 |
| CF6 | 1.1 (±0.13) × 10⁵ | 2.7 (±0.5) × 10⁶ | 0 |

It can be seen from Table 2 that the biocidal films BF1-BF6 according to this invention are proven to have excellent antibacterial activity. In addition, the biocidal polymers according to this invention can be easily obtained by subjecting a precursor polymer having at least one repeating unit of formula (A) to a halogenation treatment. Therefore, this invention provides a simple and convenient process in manufacturing biocidal polymers having excellent antibacterial activities.

All patents and literature references cited in the present specification as well as the references described therein, are hereby incorporated by reference in their entirety. In case of conflict, the present description, including definitions, will prevail.

While the invention has been described in connection with specific embodiments thereof, it will be understood that it is capable of further modifications and this application is intended to cover any variations, uses, or adaptations of the invention following, in general, the principles of the invention and including such departures from the present customary practice within the art to which the invention pertains and as may be applied to the essential features hereinbefore set forth, and as follows in the scope of the appended claims.

We claim:

1. A biocidal polymer consisting essentially of at least one repeating unit of formula (A) and at least one repeating unit of formula (B):

$$\left(\!-\!N\!-\!R_1\!-\!N\!-\!\overset{O}{\overset{\|}{C}}\!-\!N\!-\!\overset{Y}{\overset{\|}{C}}\!-\!N\!-\!\overset{O}{\overset{\|}{C}}\!-\!\right) \quad (A)$$
$$\left(\!-\!N\!-\!R_1\!-\!N\!-\!\overset{O}{\overset{\|}{C}}\!-\!R_2\!-\!\overset{O}{\overset{\|}{C}}\!-\!\right) \quad (B)$$

wherein, in formula (A):
  $R_1$ in each occurrence independently represents a divalent aromatic group containing 6 to 30 carbon atoms, a $C_2$-$C_{16}$ alkylene group or an alkylene biscyclohexyl;
  Y in each occurrence independently represents an oxygen atom or a sulfur atom; and
  $Z_1$, $Z_2$, $Z_3$ and $Z_4$ in each occurrence independently represent a hydrogen atom or a halogen atom;
  wherein at least one of $Z_1$, $Z_2$, $Z_3$ and $Z_4$ in the at least one repeating unit of formula (A) is a halogen atom;
wherein, in formula (B):
  $R_1$ in each occurrence is the same as that defined in formula (A);
  $R_2$ in each occurrence independently is a group represented by a formula selected from;

$$-\!O\!-\!(\!R_3\!-\!O\!)_{n_1}\!-\!, \quad (i)$$

wherein:
  $R_3$ is an ethylene group, and $n_1$ is an integer ranging from 1 to 227; or $R_3$ is a propylene group, and $n_1$ is an integer ranging from 1 to 172;
  or $R_3$ is a tetramethylene group, and $n_1$ is an integer ranging from 1 to 138;

$$-\!O\!-\!R_4\!-\!O\!-\!, \quad (ii)$$

wherein:
  $R_4$ is a $C_2$-$C_{16}$ alkylene group;

$$-\!N\!-\!R_5\!-\!N\!-\!, \quad (iii)$$

wherein:
  $R_5$ represents a $C_2$-$C_{16}$ alkylene group, divalent aromatic group containing 6 to 30 carbon atoms, an alkylene biscyclohexyl group,

[structures shown: a trimethyl-ethyl cyclohexyl group; a dimethyl-triazinyl group; or a phenyl-bis(triazinyl) group]; or $$-\!O\!-\!R_6\!-\!(\!O\!-\!\overset{O}{\overset{\|}{C}}\!-\!R_7\!-\!\overset{O}{\overset{\|}{C}}\!-\!O\!-\!R_8\!)_{n_2}\!-\!O\!-\!, \quad (iv)$$

wherein:
  $R_6$, $R_7$ and $R_8$ independently represent a $C_2$-$C_{16}$ alkylene group, and $n_2$ is an integer ranging from 1 to 46; and $$-\!O\!-\!(\!R_9\!-\!\overset{O}{\overset{\|}{C}}\!-\!O\!)_{n_3}\!R_{10}\!-\!(\!O\!-\!\overset{O}{\overset{\|}{C}}\!-\!R_{11}\!)_{n_4}\!-\!O\!-\!, \quad (v)$$

wherein:
  $R_9$ and $R_{11}$ independently represent a $C_2$-$C_{16}$ alkylene group,
  $R_{10}$ represents a $C_2$-$C_{16}$ alkylene group or $-R_{12}-O-R_{13}$,
  $R_{12}$ and $R_{13}$ independently represent a $C_2$-$C_4$ alkylene group, and
  $n_3$ and $n_4$ independently are an integer ranging from 1 to 86; and
  $Z_5$ and $Z_6$ in each occurrence independently represent a hydrogen atom or a halogen atom;
wherein in the biocidal polymer, the molar ratio of the at least one repeating unit of formula (A) to the at least one repeating unit of formula (B) is in a range of 0.003:0.997 to 0.999:0.001; and
wherein the biocidal polymer has an average weight molecular weight ranging from 500 to 2,000,000.

2. The biocidal polymer of claim 1, wherein in the at least one repeating unit of formula (A), both $Z_3$ and $Z_4$ are a halogen atom.

3. The biocidal polymer of claim 1, wherein the halogen atom is selected from the group consisting of chlorine, bromine, and a combination thereof.

4. The biocidal polymer of claim 1, wherein in the at least one repeating unit of formula (A), Y in each occurrence represents an oxygen atom.

5. The biocidal polymer of claim 1, wherein in the at least one repeating unit of formula (A) and the at least one repeating unit of formula (B), $R_1$ in each occurrence independently represents a divalent aromatic group containing 6 to 13 carbon atoms, a $C_2$-$C_{12}$ alkylene group, or a 4,4'-methylene biscyclohexyl group.

6. The biocidal polymer of claim 5, wherein the divalent aromatic group containing 6 to 13 carbon atoms is selected from a phenylene group, a naphthylene group, a 3-methyl-m-phenylene group, a 2-methyl-p-phenylene group, and a 4,4'-methylene bisphenyl group.

7. The biocidal polymer of claim 1, wherein in the at least one repeating unit of formula (B) of the biocidal polymer, $R_2$ is a group represented by the formula in which $R_3$ is an ethylene group and $n_1$ is an integer ranging from 1 to 91.

8. The biocidal polymer of claim 1, wherein in the at least one repeating unit of formula (B) of the biocidal polymer, $R_2$ in each occurrence independently is a group represented by the formula in which $R_3$ is a propylene group and $n_1$ is an integer ranging from 1 to 70.

9. The biocidal polymer of claim 1, wherein in the at least one repeating unit of formula (B) of the biocidal polymer, $R_2$ in each occurrence independently is a group represented by the formula in which $R_3$ is a tetramethylene group and $n_1$ is an integer ranging from 1 to 56.

10. The biocidal polymer of claim 1, wherein in the at least one repeating unit of formula (B) of the biocidal polymer, $R_2$ in each occurrence independently is a group represented by the formula —O—$R_4$—O—, in which $R_4$ is a tetramethylene group.

11. The biocidal polymer of claim 1, wherein in the at least one repeating unit of formula (B) of the biocidal polymer, $R_2$ in each occurrence independently is a group represented by the formula in which $R_5$ is a $C_2$-$C_{12}$ alkylene group, a phenylene group, a naphthylene group, a 4,4'-methylene bisphenyl group, a 4,4'-methylene biscyclohexyl group, a 3-methyl-m-phenylene group, a 2-methyl-p-phenylene group, 12. The biocidal polymer of claim 1, wherein in the at least one repeating unit of formula (B) of the biocidal polymer, $R_2$ in each occurrence independently is a group represented by the formula in which $R_6$, $R_7$ and $R_8$ independently represent a $C_2$-$C_{12}$ alkylene group, and $n_2$ is an integer ranging from 1 to 18.

13. The biocidal polymer of claim 1, wherein in the at least one repeating unit of formula (B) of the biocidal polymer, $R_2$ in each occurrence independently is a group represented by the formula wherein $R_9$ and $R_{11}$ independently represent a $C_2$-$C_{12}$ alkylene group;

$R_{10}$ is a $C_2$-$C_{12}$ alkylene group or —$R_{12}$—O—$R_{13}$—, where $R_{12}$ and $R_{13}$ independently represent a $C_2$-$C_4$ alkylene group; and

$n_3$ and $n_4$ independently are an integer ranging from 1 to 34.

14. The biocidal polymer of claim 1, which is in a form selected from fiber, fabric, film, foam, gel and solution.

15. The biocidal polymer of claim 1, which is fabricated into a surface treating agent.

16. A process for preparing a biocidal polymer according to claim 1, comprising subjecting a precursor polymer to a halogenation treatment, the precursor polymer consisting essentially of at least one repeating unit of formula (A') and at least one repeating unit of formula (B'):

(A')

(B')

wherein Y, $R_1$, and $R_2$ are the same as those defined in claim 1;

such that the hydrogen atom in at least one N—H bond of the at least one repeating unit of formula (A') is replaced by a halogen atom.

17. The process of claim 16, wherein the halogenation treatment is implemented using a halogenating reagent containing chlorine, bromine or a combination thereof.

18. The process of claim 17, wherein the halogenating reagent is selected from the group consisting of perhalic acid, perhalates, halic acid, halates, halous acid, halites, hypohalous acid, hypohalites, halogen gases, trichloroisocyanuric acid, and combinations thereof.

19. The process of claim 16, wherein the precursor polymer is prepared by subjecting a mixture of at least one diamine, at least one diisocyanate, and at least one active hydrogen-containing compound having a chemical structure of formula (II):

H—$R_2$—H  (II)

to a polymerization reaction,
wherein the at least one diamine is selected from urea, thiourea and a combination thereof,
wherein the at least one diisocyanate has a chemical structure of formula (I):

OCN—$R_1$—NCO  (I)

wherein, $R_1$ is the same as that defined in claim 1; and
wherein, in formula (III), $R_2$ is the same as that defined in claim 1.

20. The process of claim 19, wherein the at least one diamine is urea.

21. The process of claim 19, wherein in the chemical structure of the at least one diisocyanate, $R_1$ represents a divalent aromatic group containing 6 to 13 carbon atoms, a $C_2$-$C_{12}$ alkylene group, or a 4,4'-methylene biscyclohexyl group.

22. The process of claim 21, wherein the divalent aromatic group containing 6 to 13 carbon atoms is selected from a phenylene group, a naphthylene group, a 3-methyl-m-phenylene group, a 2-methyl-p-phenylene group, and a 4,4'-methylene bisphenyl group.

23. he process of claim 19, wherein in the chemical structure of the at least one active hydrogen-containing compound, $R_2$ is a group represented by the formula

, in which $R_3$ is an ethylene group and $n_1$ is an integer ranging from 1 to 91.

24. The process of claim 19, wherein in the chemical structure of the at least one active hydrogen-containing compound, $R_2$ is a

, group represented by the formula in which $R_3$ is a propylene group and $n_1$ is an integer ranging from 1 to 70.

25. The process of claim 19, wherein in the chemical structure of the at least one active hydrogen-containing compound, $R_2$ is a group represented by the formula

, in which $R_3$ is a tetramethylene group and $n_1$ is an integer ranging from 1 to 56.

26. The process of claim 19, wherein in the chemical structure of the at least one active hydrogen-containing compound, $R_2$ is a group represented by the formula —O—$R_4$—O—, in which $R_4$ is a tetramethylene group.

27. The process of claim 19, wherein in the chemical structure of the at least one active hydrogen-containing compound, $R_2$ is a group represented by the formula

, in which $R_5$ is a $C_2$-$C_{12}$ alkylene group, a phenylene group, a naphthylene group, a 4,4'-methylene bisphenyl group, a 4,4'-methylene biscyclohexyl group, a 3-methyl-m-phenylene group, a 2-methyl-p-phenylene group, 28. The process of claim 19, wherein in the chemical structure of the at least one active hydrogen-containing compound, $R_2$ is a group represented by the formula in which $R_6$, $R_7$ and $R_8$ independently represent a $C_2$-$C_{12}$ alkylene group, and $n_2$ is an integer ranging from 1 to 18.

29. The process of claim 19, wherein in the chemical structure of the at least one active hydrogen-containing compound, $R_2$ is a group represented by the formula wherein $R_9$ and $R_{11}$ independently represent a $C_2$-$C_{12}$ alkylene group;

$R_{10}$ is a $C_2$-$C_{12}$ alkylene group or —$R_{12}$—O—$R_{13}$—, where $R_{12}$ and $R_{13}$ independently represent a $C_2$-$C_4$ alkylene group; and $n_3$ and $n_4$ independently are an integer ranging from 1 to 34.

30. The process of claim 19, wherein based on the total moles of the at least one diamine and the at least one diisocyanate, the active hydrogen-containing compound is used in an amount ranging from 0.3 mol % to 99.7 mol %.

\* \* \* \* \*